United States Patent [19]
Farrant

[11] 4,111,571
[45] Sep. 5, 1978

[54] BALL AND SOCKET JOINTS

[75] Inventor: David John Rowland Farrant, Leamington Spa, England

[73] Assignee: Automotive Products Limited, Warwickshire, England

[21] Appl. No.: 832,206

[22] Filed: Sep. 12, 1977

[30] Foreign Application Priority Data

Sep. 21, 1976 [GB] United Kingdom ............... 39177/76

[51] Int. Cl.² ............................................. F16C 11/06
[52] U.S. Cl. ................................. 403/27; 116/114 Q; 403/138
[58] Field of Search ................. 403/27, 138, 137, 144; 116/114 Q

[56] References Cited

U.S. PATENT DOCUMENTS

| 3,890,052 | 6/1975 | Herbenar et al. ...................... 403/27 |
| 3,960,457 | 6/1976 | Gaines et al. ........................... 403/27 |

*Primary Examiner*—Andrew V. Kundrat
*Attorney, Agent, or Firm*—Kemon & Estabrook

[57] ABSTRACT

According to this invention there is provided a ball and socket joint for use on automobiles and more particularly for use in the steering and suspension systems of automobiles. The ball joint includes a ball pin, the ball of which is rotatable within a housing and is capable of limited universal rotational movement therein. Such constant movement causes wear within the joint and it is desirable to have some means of readily assessing this wear.

To enable this wear to be readily estimated by some means external to the housing, the bearing end cap is slidably engaged along one axis with a second member, substantially external to the housing and which is fixed relative to the housing along the one axis and also is rotatable about the said axis. The bearing end cap being displaced by a spring means from either of a rotatable or an interlocked state relative to the second member, to the other of the alternative states, such displacement be accommodated by the wear within the ball joint. The wear can then be detected by the change in whether the second member can be rotated or not relative to the housing.

9 Claims, 4 Drawing Figures

BALL AND SOCKET JOINTS

This invention relates to ball and socket joints for automobiles and more particularly to the type of joint utilised in steering and suspension systems.

The ball joints as utilised in the steering and suspension systems of automobiles are subject to a process of gradual wear. Sometimes, because of the orientation of the ball joint in relation to the loads exerted upon it, this wear may not be readily detected and it is known for ball joints to deteriorate to such an extent that the ball pin will come free from its housing. It is therefore desirable to be able to have some means of readily assessing when the wear in a ball joint has become excessive.

According to this invention there is provided a ball and socket joint suitable for use on automobiles which includes, a ball pin held within a housing and capable of limited universal rotational movement relative to the housing; a first member within the housing that lies adjacent the rotatable surface of the ball pin; a resilient means which biases the first member towards the rotatable surface of the ball pin such that wear in the ball and socket joint results in a relaxation of the resilient means in conjunction with movement of the first member; a second member slidably engaged along one axis with the first member, the said second member being fixed relative to the housing along the one axis but being rotatable with the housing about the one axis, and the second member is externally accessible so as to effect such rotation; wherein the said movement of the first member results in displacement along the one axis of the first member relative to the second member such that when the first member is in first position relative to the second member along the one axis the said members are interlocked against relative rotational movement about the one axis, and when the first member is in a second position relative to the second member along the one axis the said second member is free to rotate about the one axis relative to the first member and where the said movement is from either one to the other of said first and second positions.

Preferably the said movement results in a displacement of the first member relative to the second member along the one axis from the first position in which the said members are interlocked against relative rotational movement about the one axis to the second position in which the second member is free to rotate about the one axis relative to the internal first member.

It is convenient for the resilient means to be a coil spring and for the first means to be a bearing end cap such that the spring biases the end cap against the ball of the ball pin and provides some resistance to rotation of the ball pin.

Preferably the bearing end cap is moulded from a plastics bearing material and the means for slidable engagement with the second member is integral with the end cap.

It is preferable for the second member to be substantially external to the housing and to be a snap fit in an aperture in the housing wall. It is convenient for the second member to be moulded from a suitable plastics material, with a provision for an integral seal to prevent dirt from entering the housing via the aperture.

Some embodiments of this invention will now be described by way of example and with reference to the accompanying drawings in which.

Figure 1:
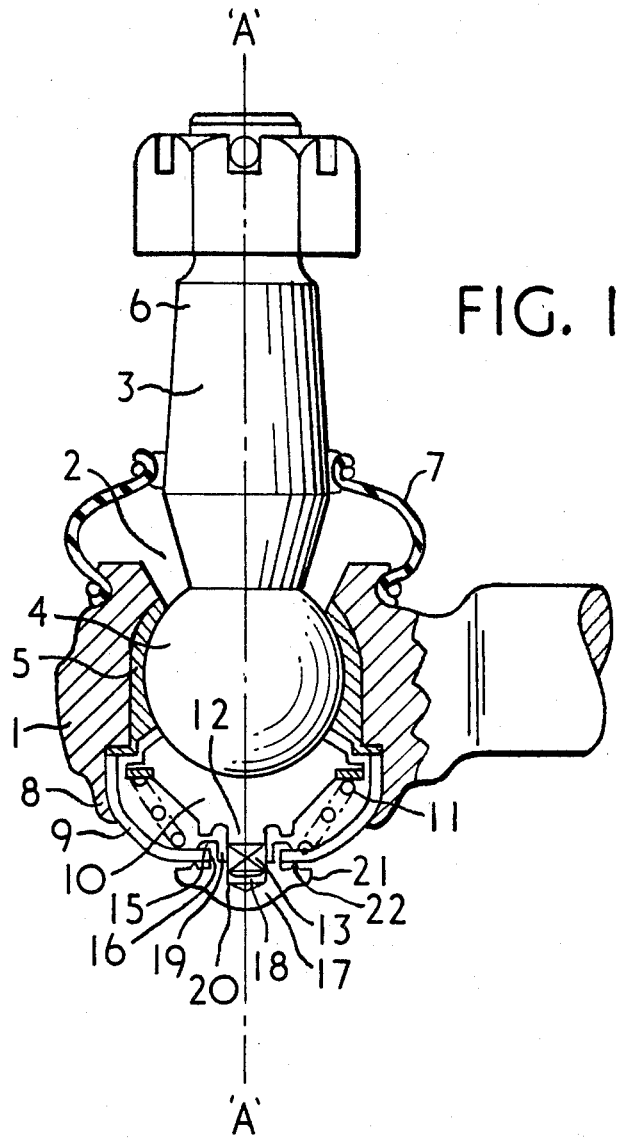
FIG. 1 is a cross-section through a ball joint according to this invention.

With reference to FIG. 1, a ball and socket joint, as may be used in the steering systems of automobiles, comprises a socket housing 1 in which the ball 4 of the ball pin 3 is housed. The shank 6 of the ball pin projects through a first aperture 2 in the housing 1, the aperture 2 being of such a size that the ball 4 of the ball pin cannot pass through it. A nylon or acetal bearing seat 5, provides a bearing surface between the ball pin and the socket in which the ball pin can rotate. The bearing seat 5 also has an aperture through which the shank passes. The shank 6 provides the means of attachment to another component (not shown) of the steering system. The ball 4 of the ball pin is capable of limited universal rotational movement within the bearing seat 5, the limits of movement are determined by the abutment of the shank 6 with the edges of the aperture 2. An elastomeric boot 7 is attached, on its inner periphery to the shank 6 of the ball pin 3, and on its outer periphery to the housing and thus prevents the ingress of dirt into the ball and socket joint.

The socket housing 1 has a second aperture 8, which is opposite the aperture 2, and it is by means of the second aperture 8 that the ball pin 3 is assembled into the housing 1. The aperture 8 is closed by a metal cover 9 which is held in position by deforming the peripheral rim of the aperture 8 of the housing so that it grips the metal cover 9. A nylon or acetal internal first member, hereinafter referred to as a bearing end cap 10, is biased against the surface of the ball 4 by a spring 11 acting between the metal cover 9 and the bearing end cap 10. The residual load in the spring provides a resistance against the rotation of the ball pin and ensures that the bearing end cap 10 is held against the surface of the ball 4.

The bearing end cap 10 has a projection 12, aligned along the axis A in FIG. 1, which has a square sectioned end portion 13. The projection 12 passes through a central aperture 16 in the metal cover 9, so that the end portion 13 is external to the housing 1. An external second member 17 is moulded from e.g. nylon, and is a snap fit in the aperture 16 by virtue of its moulded-in annular lip 15, such that the external member 17 is held against axial movement but can freely rotate in the aperture 16. The external member 17 has an axially aligned blind cavity 18 in surface adjacent the cover 9. The cavity 18 has at its blind end a square sectioned portion 20 designed to mate with square sectioned portion 13 of the projection 12, and at its open end a larger circular sectioned portion 19 in which the square sectioned portion 13 of the projection 12 will be free to rotate.

The external portion of the member 17 carries a pair of diametrically projecting wings to facilitate the rotation of the member 17, and also a moulded-in annular lip 22 in the face of the member 17 adjacent the metal cover 9 to act as a seal against the entry of dirt via the aperture 16. The wings are sufficiently flexible to prevent them from transmitting excessive torque.

When the ball joint is assembled the projection 12 of the bearing end cap 10 is axially and slidably aligned within the internal cavity 18 of the rotatable external member 17 such that the square sectioned portion 13 of the projection 12 mates with the square sectioned portion 20 of the cavity 18, such that the external member 17 is locked against rotation. The spring 11 should normally engage the bearing end cap 10 with sufficient force to hold the bearing end cap against rotation, but if necessary some positive means of preventing rotation of the bearing end cap may be provided, for example a keyed connection to the bearing seat 5.

The constant rotation of the ball of the ball pin 3 in the bearing seat 5 results in wear taking place on the bearing surfaces. As wear takes place, the spring 11 biases the bearing end cap 10 against the surface of the ball 4 with the result that the bearing end cap is axially displaced towards the ball 4.

This axial displacement of the bearing end cap 10 gradually withdraws the square sectioned portion 13 of the projection 12 from its mating cavity in the external member 17 until it comes clear of the square sectioned portion 20 of the cavity and is now in the larger circular portion 19 of the said cavity. When this occurs it is now possible to rotate the external member 17. Thus by regulating the amount of overlap between the square section 13 on the projection 12 and the square sectioned cavity in the external member 17, it is possible to obtain a meas of assessing excessive wear within the ball joint by means external to the housing 1.

Figure 2:
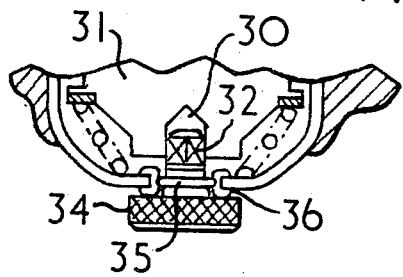
FIG. 2 is a cross-section through a portion of a ball joint according to another aspect to this invention.
Figure 3:
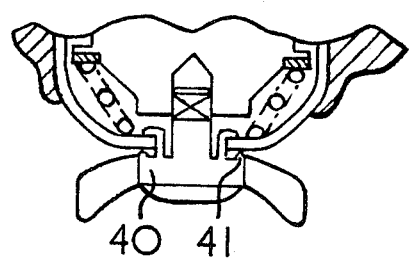
FIG. 3 is a cross-section through a portion of a ball joint according to yet another aspect of this invention.
Figure 4:
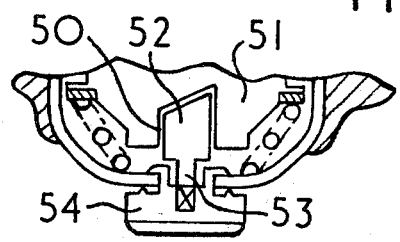
FIG. 4 is a cross-section through a portion of a ball joint according to yet another aspect of this invention.

FIG. 2, FIG. 3 and FIG. 4 show variations in the type of mechanisms used for the initial interlock between the bearing end cap and the external member, and also show a different means for sealing the aperture in the metal end cap (FIG. 2 only).

In FIG. 2 the mechanism of the interlock system is reversed, the square sectioned cavity 30 is in the bearing end cap 31 and the square sectioned projection 32 is part of the external member 34. The excessive wear being indicated when the projection 32 comes clear of the cavity 30.

The means of sealing the external member 34 in the aperture in the end plate is also different. The external member 34 carries a raised annular rib 35 which locks into a resilient grommet 36.

In FIG. 3 the basic mechanism is as described for FIG. 2 with an external member 40 which is a snap fit type with an integral seal 41, and in which the external head of the member has been provided with wings to aid turning the member 40.

In FIG. 4 the cavity 50 in the bearing end cap 51 is of circular cross-section with a blind-end which is in an oblique plane. A cylindrical peg 52 is designed to mate with the blind-end of the cavity 50. The peg 52 has a stem 53 which has a square end which is a snap fit into the external member 54. The external member 54 is of the same basic design for snap in fitting and sealing with the aperture in the metal cap as in FIG. 2.

This design has the advantage that as the bearing end cap 51 moves towards the ball of the ball pin and the two angled planes part, slight wear can be detected by there being some rotational movement available between the peg 52 and the cavity 50. Thus there is gradual indication from the no-wear, completely locked state to the excessive wear completely rotatable state.

I claim:

1. A ball and socket joint suitable for use on automobiles which includes:
    a pin with a ball thereon;
    a housing receiving said ball and defining a first aperture through which said pin projects;
    mating bearing surfaces on said ball and said socket such that the pin can move angularly with respect to the socket;
    a first member within the housing that lies adjacent the rotatable surface of the ball;
    a resilient means which biasses the first member towards the rotatable surface of the ball pin such that any wear in the ball and socket joint results in a relaxation of the resilient means in conjunction with displacement of the first member;
    and a second member having a portion slidably engaged and partially rotatably interlocked along one axis with the first member and being axially fixed relative to the housing along the one axis but rotatable relative to the housing about the one axis and the second member is readily accessible from without the housing so as to effect such rotation;
    wherein; the said displacement along the one axis of the first member relative to the second member is such that when the first member is in a first position along the one axis the second member is locked against rotation about the one axis, and when the first member is in a second position along the one axis the second member is free to rotate about the one axis, and where the said displacement is from either one to the other of said first and second positions.

2. A ball and socket joint according to claim 1, wherein the said displacement results in movement of the first member relative to the secnd member from said first position to said second position along the one axis.

3. A ball and socket joint according to claim 1, wherein the resilient means is a coil spring.

4. A ball and socket joint according to claim 1, wherein the first member is a bearing end cap which the resilient means biasses against the ball of the ball pin.

5. A ball and socket joint according to claim 4, wherein the bearing end cap is moulded from a plastics bearing material and the means for slidable engagement with the second member are integral therewith.

6. A ball and socket joint according to claim 1, wherein the second member is substantially external to the housing.

7. A ball and socket joint according to claim 6, wherein the second member is a snap fit into a second aperture defined by the wall of the housing and aligned along the one axis.

8. A ball and socket joint according to claim 7, wherein the second member is moulded from a plastics material and has an integral seal to prevent dirt from entering the housing via the aperture.

9. A ball and socket joint according to claim 6, wherein that portion of the second member that is external to the housing has means to facilitate the rotation of the second member relative to the first member.

* * * * *